United States Patent [19]
Gehrke

[11] 3,832,076

[45] Aug. 27, 1974

[54] SPLINED ASSEMBLY WITH RETAINING RINGS

[75] Inventor: Glenn F. Gehrke, Saginaw, Mich.

[73] Assignee: General Motors Corporation, Detroit, Mich.

[22] Filed: Sept. 25, 1972

[21] Appl. No.: 291,897

[52] U.S. Cl. ............................................. 403/359
[51] Int. Cl. ............................................. F16d 1/10
[58] Field of Search ........... 403/230, 263, 298, 359; 285/DIG. 22

[56] References Cited
UNITED STATES PATENTS
| | | | |
|---|---|---|---|
| 738,503 | 9/1903 | Waters | 285/DIG. 22 |
| 3,531,144 | 9/1970 | Bizilia | 403/359 X |
| 3,622,185 | 11/1971 | Rosan, Sr. et al. | 403/359 X |

FOREIGN PATENTS OR APPLICATIONS
987,046  3/1965  Great Britain

*Primary Examiner*—Werner H. Schroeder
*Attorney, Agent, or Firm*—R. L. Phillips

[57] ABSTRACT

Male and female spline members are retained together by a retaining ring which is urged by ramps on one end of the splines of one of the members into an assembly-disassembly position in an annular groove on the other member and on proper mating of the members assumes a retention position in the first mentioned groove and in another groove in the one member which is ramped on one side to provide for disassembly by reversal of this assembly operation.

3 Claims, 3 Drawing Figures

SPLINED ASSEMBLY WITH RETAINING RINGS

This invention relates to a splined assembly having a retaining ring and more particularly to a splined assembly with an automatically positioned retaining ring.

Conventional retaining means for splined assemblies normally comprise either one or two retaining rings to retain the spline members in a desired mating relationship. In the case of the single retaining ring there is normally required a specially designed ring as well as an accommodating space machined on one of the spline members to receive a specialized disassembly tool for this ring. In the case of two retaining rings, there is normally required very close machining tolerances on the rings' grooves to prevent excessive axial play. Furthermore, both of these conventional type retaining ring arrangements normally limit the torque carrying ability of the male spline member because they have a ring groove placed in a critically stressed section.

According to the present invention there is provided a splined assembly with a single retaining ring which is urged by ramps provided on one end of the splines of one of the members into a noninterfering assembly-disassembly position in a retaining groove on the other spline member as the two spline members are mated. The tips of the splines on the one member thereafter maintain the retaining ring in its noninterfering position until the two spline members are in the desired mating relationship which is retained by the retaining ring then expanding into a retaining groove in the one spline member while continuing to occupy the other groove. The splines on this one spline member have ramps at the groove on this member which are engaged by the ring to limit axial play between the spline members and urge the retaining ring into its noninterfering position to permit disassembly on application of a predetermined disassembly force urging relative movement between the spline members in a direction opposite that of the assembly direction. Thus, the retaining ring is automatically placed in its retention condition as the spline members are mated and permits disassembly all without the need of any disassembly tool for the ring. Furthermore, this retaining ring arrangement is useful in restrictive environments such as where insertion of the retaining ring is only possible from one end of the spline assembly and it is required to locate the ring near the other end in a noncritical stressed section of the assembly.

An object of the present invention is to provide in a splined assembly a new and improved retaining ring arrangement.

Another object is to provide in a splined assembly a retaining ring which is automatically conditioned on mating of the spline members in a retaining condition and permits their disassembly on reversal of the operation.

Another object is to provide in a splined assembly a retaining ring that is operated on by one of the spline members to assume a condition permitting their mating and then maintains them in a predetermined mating relationship and in addition is operated on by the same spline member to permit disassembly.

Another object is to provide in a splined assembly a retaining ring which is urged by ramps on one of the splined members into a noninterfering condition in a retaining groove of the other member to permit mating of the spline members and on proper mating assumes an interference position in a retaining groove in the one spline member while continuing to occupy the first mentioned groove to retain the spline members together with the one spline member also having ramps that limit axial play and in addition operate to position the retaining ring in its noninterfering condition to provide for disassembly on reversal of the assembly operation.

These and other objects of the present invention will be more apparent from the following description and drawing in which.

Figure 1:
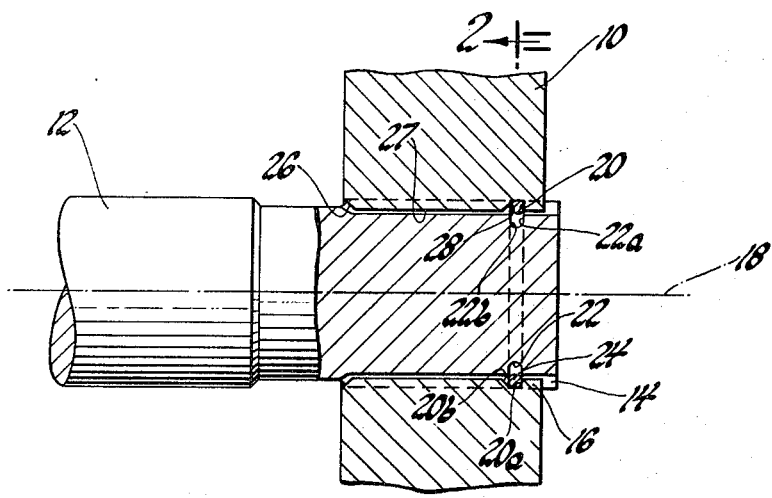
FIG. 1 is a view partially in section of a splined assembly with a retaining ring arrangement according to the present invention.

Referring to FIG. 1 there is shown a splined assembly in a desired mating relationship that is maintained by a retaining ring arrangement constructed according to the present invention. The splined assembly comprises a female member 10 having an aperture receiving a male member 12. The female and male members 10 and 12 have equally angularly spaced splines 16 and 14 which mate within the female's aperture and prevent relative movement between these members in all but two opposite directions along the axis 18 of the spline portions of these members.

According to the present invention the female member 10 has an annular radially inwardly facing retaining groove 20 in its aperture that is located radially opposite an annular radially outwardly facing retaining groove 22 on the male member 12 when the spline members 10 and 12 are in a desired mating relationship as shown in FIG. 1. The female member's retaining groove 20 has a flat axially extending bottom, one flat side wall 20a perpendicular to the axis 18 and another flat side wall 20b inclined to axis 18 for reasons which will become more apparent later. The male member's retaining groove 22 has a circular arc bottom and parallel flat side walls 22a and 22b perpendicular to axis 18.

Figure 2:
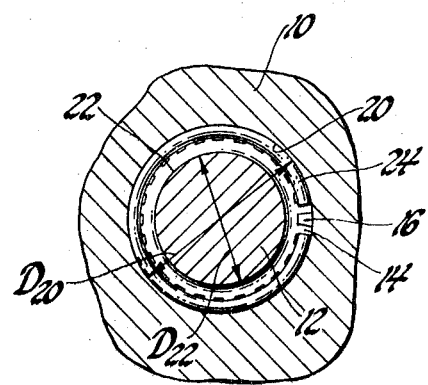
FIG. 2 is a view taken along the line 2—2 in FIG. 1.

The spline members 10 and 12 are retained together by a retaining ring 24 of the simple snap ring type which is split as shown in FIG. 2 and is positionable to occupy both the retaining grooves 20 and 22 when these grooves are radially aligned. The retaining grooves 20 and 22 intersect the splines 16 and 14 of the respective spline members 10 and 12 and the bottom diameter $D_{20}$ of the female member's retaining groove 20 and the size of the retaining ring are determined so that the retaining ring is expanded against the bottom of retaining groove 20 and is in interference contact with the splines 14 and 16 between their major and minor diameters at the retaining groove intersections to resist relative movement between the spline members in either direction along the axis 18. For example, relative rightward movement of the male member 12 is prevented by the retaining ring 24 being trapped between the grooves' side walls 20a and 22b and relative leftward movement of the male member is prevented by the retaining ring 24 being trapped between the grooves' side walls 20b and 22a.

Figure 3:
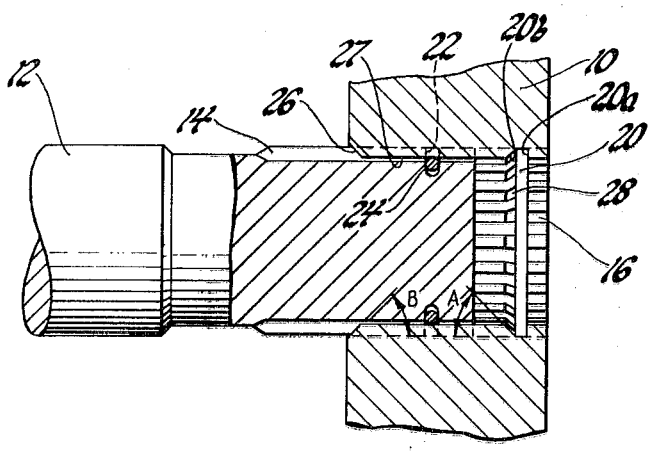
FIG. 3 is a view similar to FIG. 2 but showing the spline members during either assembly or disassembly.

Automatic positioning of the retaining ring 24 to permit assembly and disassembly of the spline members is provided by the male member's retaining groove 22 having a depth to its bottom diameter $D_{22}$ sufficiently greater than the depth of the intersected splines 14 at their minor diameter so that the retaining ring 24 is displaceable under radial load to an assembly-disassembly or noninterfering position as shown in FIG. 3 within the retaining groove 22 radially inward of or beneath the tips of the female splines 16 which are at these splines' minor diameter. For positioning the remaining ring 24 in its assembly-disassembly position to permit spline member assembly and then provide for automatic positioning of the retaining ring 24 in its retention position, the female splines 16 at their lefthand end are chamfered so that they each have an identical assembly ramp 26 at a ramp angle B. With the retaining ring 24 mounted in the male member's retaining groove 22 and then on insertion of the male member 12 into the female member 10 the male member's retaining groove side wall 22b forces the retaining ring 24 against the assembly ramps 26. Then on continued assembly force application the retaining ring 24 is forced by the assembly ramps 26 to contract to its assembly-disassembly position whereafter the male member 12 can then be readily moved toward the desired mating relationship with the female splines at their minor diameter along their tips 27 maintaining the retaining ring in its noninterference position until the retaining grooves 20 and 22 are radially aligned whereupon the retaining ring 24 is relieved of this radially inwardly acting force and then expands radially outward to assume its retention position. Positioning of the retaining ring 24 in its assembly-disassembly position to permit disassembly is effected by the inclined side wall 20b of the rataining groove 20 which provides identical disassembly ramps 28 with a ramp angle A on the female member's splines 16 whose inclination is opposite that of the assembly ramps 26. The disassembly ramps 28 limit axial play between the spline members and in response to a disassembly force urging removal of the male member from the female member force the male member's retaining ring groove side wall 22a forces the retaining ring 24 against the disassembly ramps 28. Then on continued disassembly force application the disassembly ramps 28 force the retaining ring 24 to contract to its assembly-disassembly position in the retaining groove 22 on the male member whereafter the female spline tips 27 then maintain the retaining ring in its noninterference position to permit easy disassembly of the members.

The magnitudes of the assembly and disassembly forces are a function of the retaining ring's configuration and strength and the respective assembly and disassembly ramp angles and thus both the assembly and disassembly forces may be predetermined according to the installation, the disassembly force being determined to be greater than the forces urging disassembly during normal usage. Furthermore, the positioning of the retaining ring does not require a disassembly tool since such positioning is automatically provided by the disassembly ramps. Furthermore, the disassembly force remains predictable since the retaining ring is completely captured in contact with the disassembly ramps.

In addition, it will be appreciated that in an installation where the female member has a blind side the retaining ring may nevertheless be located near this blind side with the retaining ring inserted from the female member's other side. In addition, the positioning of the retaining ring and its accommodating retaining grooves may be spaced anywhere along the length of engagement of the splines and, therefore, there is permitted a choice of location of the retaining ring and its retaining grooves outside of a critically stressed zone which may occur near either end of the line of spline engagement. It will also be appreciated by those skilled in the art that while the embodiment shown has both the assembly ramps and disassembly ramps provided on the female member and the retaining ring placed in its assembly-disassembly condition on the male member, this arrangement may be reversed to have the assembly and disassembly ramps on the male member with the retaining ring then expanding into the female member for assembly and disassembly and contracting onto the male member for assembly retention.

The above described embodiments are illustrative of the invention which may be modified within the scope of the appended claims.

I claim:

1. In a splined assembly a female member having an aperture, a male member receivable in said aperture, said members having splines mating within said aperture for preventing relative movement between said members in all but two opposite directions, said female member having an annular retaining groove in said aperture intersecting the female member splines, said male member having an annular retaining groove intersecting the male member splines that aligns with said retaining groove in said female member when said members are in a desired mating relationship, a round retaining ring that when positioned in said retaining grooves when said retaining grooves are aligned assumes a retention position wherein it is in interference contact with said splines on said members at the groove intersections to resist relative movement between said members in said opposite directions independent of any other means, the retaining groove in one of said members having a depth sufficiently greater than the depth of the intersected splines so that said retaining ring may be displaced under load to an assembly-disassembly position within said one member's retaining groove out of the path of the splines on the other member, the splines on said other member having ramps at one end for forcing said retaining ring into said assembly-disassembly position on said one member as said members are mated on application of a predetermined force urging relative movement between said members in one of said opposite directions with the splines on said other member thereafter maintaining said retaining ring in said assembly-disassembly position until said retaining grooves are aligned whereupon said retaining ring assumes said retention position to retain said members in assembly, and the splines on said other member at one side of their intersection with the retaining groove in said other member having ramps for forcing said retaining ring into said assembly-disassembly position on said one member on application of a predetermined force urging relative movement between said members in the other of said opposite directions whereafter the splines on said other member maintain said retaining ring in said assembly-disassembly position to permit disassembly of said members.

2. In a splined assembly a female member having an aperture, a male member receivable in said aperture, said members having splines with major and minor diameters mating within said aperture for preventing relative movement between said members in all but two opposite directions, said female member having an annular retaining groove in said aperture intersecting the female member splines, said male member having an annular retaining groove intersecting the male member splines that aligns with said retaining groove in said female member when said members are in a desired mating relationship, a split round retaining ring that when positioned in said retaining grooves when said retaining grooves are aligned assumes a retention position wherein it is in interference contact with said splines on said members between their major and minor diameters at the groove intersections to resist relative movement between said members in said opposite directions independent of any other means, the retaining groove in one of said members having a depth sufficiently greater than the depth of the intersected splines so that said retaining ring may be displaced under load to an assembly-disassembly position within said one member's retaining groove out of the path of the splines on the other member, the splines on said other member having assembly ramps at one end for forcing said retaining ring into said assembly-disassembly position on said one member as said members are mated on application of a predetermined force urging relative movement between said members in one of said opposite directions with the splines on said other member at their tips thereafter maintaining said retaining ring in said assembly-disassembly position until said retaining grooves are aligned whereupon said retaining ring assumes said retention position to retain said members in assembly, and the splines on said other member at one side of their intersection with the retaining groove in said other member having disassembly ramps for forcing said retaining ring into said assembly-disassembly position on said one member on application of a predetermined force urging relative movement between said members in the other of said opposite directions whereafter the splines on said other member at their tips maintain said retaining ring in said assembly-disassembly position to permit disassembly of said members.

3. In a splined assembly a female member having an aperture, a male member receivable in said aperture, said members having splines with major and minor diameters mating within said aperture for preventing relative movement between said members in all but two opposite directions, said female member having an annular radially inwardly facing retaining groove in said aperture intersecting the female member splines, said male member having an annular radially outwardly facing retaining groove intersecting the male member splines that aligns with said retaining groove in said female member when said members are in a desired mating relationship, a retaining ring that when positioned in said retaining grooves when said retention grooves are aligned assumes a retention position wherein it is in interference contact with said splines on said members at the groove intersections to resist relative movement between said members in said opposite directions independent of any other means, the retaining groove in said male member having a depth sufficiently greater than the depth of the intersected splines so that said retention ring may be displaced under load to an assembly-disassembly position within said male member retaining groove inward of the minor diameter of the splines on said female member, the splines on said female member having assembly ramps at one end for forcing said retaining ring into said assembly-disassembly position on said male member as said members are mated on application of a predetermined force urging relative movement between said members in one of said opposite directions with the splines on said female member at their minor diameter thereafter maintaining said retaining ring in said assembly-disassembly position until said annular grooves are aligned whereupon said retaining ring assumes said retention position to retain said members in assembly, and the splines on said female member at one side of their intersection with the retaining groove in said female member having disassembly ramps for forcing said retaining ring into said assembly-disassembly position on said male member on application of a predetermined force urging relative movement between said members in the other of said opposite directions whereafter the splines on said female member at their minor diameter maintain said retaining ring in said assembly-disassembly position to permit disassembly of said members.

\* \* \* \* \*